United States Patent [19]
Greene et al.

[11] Patent Number: 6,031,853
[45] Date of Patent: Feb. 29, 2000

[54] EYESAFE OPTICAL PARAMETRIC SYSTEM PUMPED BY SOLID STATE LASERS

[75] Inventors: Benny Allan Greene, Isaacs; Yue Gao, Florey; Yanjie Wang, Kaleen; Barry Luther-Davies, Bruce, all of Australia

[73] Assignee: Electro Optic Systems, Pty, Limited, New South Wales, Australia

[21] Appl. No.: 09/011,517

[22] PCT Filed: Jul. 29, 1996

[86] PCT No.: PCT/AU96/00477

§ 371 Date: Sep. 25, 1998

§ 102(e) Date: Sep. 25, 1998

[87] PCT Pub. No.: WO97/05677

PCT Pub. Date: Feb. 13, 1997

[30] Foreign Application Priority Data

Jul. 27, 1995 [AU] Australia ............................... PN4426

[51] Int. Cl.[7] ..................................................... H01S 3/10
[52] U.S. Cl. ................................. 372/22; 372/98; 372/92; 359/330
[58] Field of Search ................................. 372/21, 22, 98, 372/92, 70, 39

[56] References Cited

U.S. PATENT DOCUMENTS

| | | | |
|---|---|---|---|
| 5,181,211 | 1/1993 | Burnham et al. | 372/21 |
| 5,594,592 | 1/1997 | Harlamoff et al. | 372/21 |
| 5,606,453 | 2/1997 | Walling et al. | 372/21 |
| 5,781,571 | 7/1998 | Nabors et al. | 372/21 |
| 5,841,570 | 11/1998 | Velsko | 372/21 |

*Primary Examiner*—Leon Scott, Jr.
*Attorney, Agent, or Firm*—Knobbe, Martens, Olson & Bear, LLP.

[57] ABSTRACT

A solid state laser beam generating system includes a solid state laser which produces a laser beam having a wavelength outside the eyesafe range of 1.5 $\mu$m to 1.8 $\mu$m. A converter including a non-linear structure is used to convert the laser beam to a beam having a wavelength within the eyesafe range. The non-linear structure has three defined principal axes and the input laser beam to the structure travels in a direction offset from one of the principal axes by an angle greater than 2°.

20 Claims, 1 Drawing Sheet

EYESAFE OPTICAL PARAMETRIC SYSTEM PUMPED BY SOLID STATE LASERS

TECHNICAL FIELD

This invention relates to the generation of an eyesafe laser beam with wavelength conversion in an optical parametric system.

BACKGROUND ART

A system of this kind is disclosed in U.S. Pat. No. 5,181,211 to Burnham et al, which works from the reported understanding that laser beams having a wavelength in the range of 1.5 $\mu$m to 2.2 $\mu$m are completely absorbed by the vitreous humor of the eye cornea, thereby avoiding any damage to the retina. The patent proposes the combination of a solid state laser, such as a diode-pumped neodymium laser, with a non-linear crystal parametric converter in an associated resonant optical cavity. In order to ensure the highest efficiency of operation, the patent requires non-critical phase matching in that the incident beam from the laser is transmitted parallel to one of the principal axes of the converter crystal. The output beam is said to be polarised in a direction parallel to a second of the principal axes and the idler beam is polarised in a direction parallel to the third principal axis. A preferred non-linear crystal is potassium titanyl phosphate (KTP).

The present invention stems from an appreciation that, contrary to U.S. Pat. No. 5,181,211, beam propagation parallel to a principal axis is not necessary and that beam propagation at an angle with ±10° with respect to a principal axis can achieve parametric oscillation with no significant degradation of efficiency. Beam propagation parallel to a principal axis is also very difficult to align. Moreover, if the beam propagation is specifically off-axis, the output wavelength of the parametric converter can be tuneable according to the offset angle. This offers much greater flexibility than the type proposed in U.S. Pat. No. 5,181,211.

DISCLOSURE OF THE INVENTION

The invention accordingly provides a solid state laser beam generating system comprising, in combination:

solid state laser means for producing a first laser beam having a wavelength range outside the eyesafe range 1.5 $\mu$m to 1.8 $\mu$m; and converter means arranged to respond to the first beam by outputting a second beam having a wavelength within said eyesafe range;

wherein said converter means includes an element of non-linear structure having three defined principal axes and said system is configured such that, in operation, said first beam travels in a direction offset from one of said principal axes by an angle greater than 2°.

Preferably, the solid state laser means is a diode-pumped neodymium laser and said offset angle is in the range 2° to 10°, said offset angle is in the range of 2° to 10°, depending on the output wavelength required. Preferred neodymium lasers are Nd:YAG and Nd:YVO$_4$ lasers operating respectively at 1.0642 $\mu$m and 1.0643 $\mu$m. Other lasers which may be utilised include an Nd:YAP laser operating at 1.0726 $\mu$m or 1.0795 $\mu$m or an Nd:YLF laser operating at 1.047 $\mu$m or 1.053 $\mu$m.

The converter means is preferably an optical parametric system such as an optical parametric oscillator (OPO), optical parametric generator (OPG) or an optical parametric amplifier (OPA). The preferred non-linear element is a non-linear crystal and the preferred such crystal is potassium titanyl phosphate (KTP). The converter means can be either within the pump laser cavity (intracavity) or external to the pump laser cavity (extracavity)

BRIEF DESCRIPTION OF THE DRAWINGS

The drawing is a schematic diagram of an eyesafe solid state laser beam generating system according to the preferred embodiment of the invention.

BEST MODES FOR CARRYING OUT THE INVENTION

Figure 1:
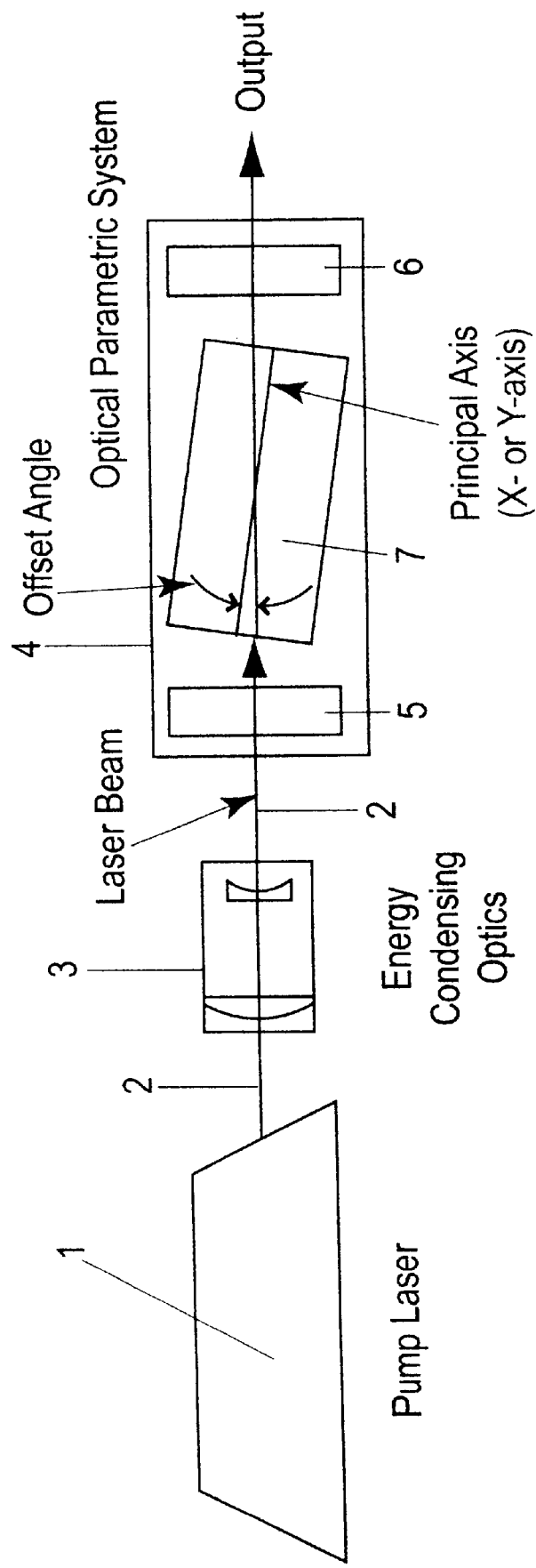

As shown in the drawing, the eyesafe laser beam generating system comprises a pump laser 1 such as a Nd:YAG laser pumped by diode array, which produces an output laser beam 2 having a wavelength of 1.0642 $\mu$m. The beam 2 passes through energy condensing optics 3 of known type before passing to an optical parametric system 4.

The optical parametric system comprises mirrors 5,6 and a non-linear crystal 7 such as a KTP crystal.

The input beam 2 travels through the crystal at an offset angle of between 2° and 10° to a principal axis to provide an output in the eyesafe wavelength range of 1.5 $\mu$m to 1.8 m. The output wavelength can be tuned by adjusting the offset angle.

Another embodiment of the present invention may be as illustrated in FIG. 3 of U.S. Pat. No. 5,181,211 (the disclosure of which is incorporated herein by reference and a copy of which is annexure 1 in this specification), except that the non-linear KTP crystal in the optical parametric oscillator is oriented to achieve the offset relationship with respect to the first laser beam from the solid state laser means in accordance with the present invention.

Depending on the application and the available input wavelength and required output wavelength, it may be desirable to use either X-cut or Y-cut crystals for the non-linear conversion. The tuneable output wavelength of the parametric converter with off-axis beam propagation can be achieved for both X and Y crystals, allowing for both types of crystals to be applied to produce tuneable eyesafe output wavelengths, with conversion efficiencies very close to the conversion efficiencies obtained for parallel alignment.

The tuneable output wavelength of the parametric converter with off axis beam propagation can be achieved for X and Y cut crystals, although the X-cut crystal (beam propagation along X-axis) results in high non-linear coefficient than the Y-cut crystal (beam propagation along Y-axis).

Throughout this specification, unless the context requires otherwise, the word "comprise", or variations such as "comprises" or "comprising", will be understood to imply the inclusion of a stated integer or group of integers but not the exclusion of any other integer or group of integers.

The described arrangement has been advanced merely by way of explanation and many modifications may be made thereto without departing from the spirit and scope of the invention, which includes every novel feature and combination of novel features herein disclosed.

We claim:

1. A solid state laser beam generating system comprising, in combination:

a solid state laser for producing a first laser bean having a wavelength range outside an eyesafe range of 1.5 $\mu$m to 1.8 $\mu$m; and a converter arranged to respond to the first beam by outputting a second beam having a wavelength within said eyesafe range;

wherein said converter comprises an element of nonlinear structure having three defined principal axes and said system is configured such that, in operation, said first beam travels in a direction offset from one of said principal axes by an angle greater than 2°.

2. A solid state laser beam generating system as claimed in claim 1, wherein said direction is offset by an angle of from 2° to 10°.

3. A solid state laser beam generating system as claimed in claim 2, wherein said solid state laser is a neodymium laser.

4. A solid state laser beam generating system as claimed in claim 3, wherein said neodymium laser is diode-pumped.

5. A solid state laser beam generating system as claimed in claim 4, wherein said converter is selected form the group consisting of an optical parametric oscillator, an optical parametric generator or an optical parametric amplifier.

6. A solid state laser beam generating system as claimed in claim 3, wherein said neodymium laser is selected from the group consisting of Nd:YAG lasers, Nd:YVO$^4$ lasers, Nd:YAP lasers and Nd:YLF lasers.

7. A solid state laser beam generating system as claimed in claim 6, wherein said converter is selected form the group consisting of an optical parametric oscillator, an optical parametric generator or an optical parametric amplifier.

8. A solid state laser beam generating system as claimed in claim 3, wherein said converter is selected form the group consisting of an optical parametric oscillator, an optical parametric generator or an optical parametric amplifier.

9. A solid state laser beam generating system as claimed in claim 2, wherein said converter is selected form the group consisting of an optical parametric oscillator, an optical parametric generator or an optical parametric amplifier.

10. A solid state laser beam generating system as claimed in claim 2, wherein said non-linear element is a nonlinear crystal.

11. A solid state laser beam generating system as claimed in claim 1, wherein said solid state laser is a neodymium laser.

12. A solid state laser beam generating system as claimed in claim 11, wherein said neodymium laser is diode-pumped.

13. A solid state laser beam generating system as claimed in claim 12, wherein said converter is selected form the group consisting of an optical parametric oscillator, an optical parametric generator or an optical parametric amplifier.

14. A solid state laser beam generating system as claimed in claim 11, wherein said neodymium laser is selected from the group consisting of Nd:YAG lasers, Nd:YVO$^4$ lasers, Nd:YAP lasers and Nd:YLF lasers.

15. A solid state laser beam generating system as claimed in claim 14, wherein said converter is selected form the group consisting of an optical parametric oscillator, an optical parametric generator or an optical parametric amplifier.

16. A solid state laser beam generating system as claimed in claim 11, wherein said converter is selected form the group consisting of an optical parametric oscillator, an optical parametric generator or an optical parametric amplifier.

17. A solid state laser beam generating system as claimed in claim 11, wherein said non-linear element is a nonlinear crystal.

18. A solid state laser beam generating system as claimed in claim 1, wherein said converter is selected form the group consisting of an optical parametric oscillator, an optical parametric generator or an optical parametric amplifier.

19. A solid state laser beam generating system as claimed in claim 1, wherein said non-linear element is a nonlinear crystal.

20. A solid state laser beam generating system as claimed in claim 19, wherein said non-linear crystal is potassium titanyl phosphate.

\* \* \* \* \*